United States Patent [19]

Nespodzany, Jr.

[11] Patent Number: 5,485,654
[45] Date of Patent: Jan. 23, 1996

[54] SPACECRAFT HANDLE

[75] Inventor: Robert P. Nespodzany, Jr., Phoenix, Ariz.

[73] Assignee: Honeywell Inc., Minneapolis, Minn.

[21] Appl. No.: 340,499

[22] Filed: Nov. 15, 1994

[51] Int. Cl.$^6$ .................................................. A47B 95/02
[52] U.S. Cl. .................................... 16/114 R; 294/15
[58] Field of Search ................................ 16/114 R, 115, 16/125, 111 R; 294/15; 248/225.51, 225.52

[56] References Cited

U.S. PATENT DOCUMENTS

| | | | |
|---|---|---|---|
| 3,484,894 | 12/1969 | Fletcher | 294/15 |
| 4,912,809 | 4/1990 | Scheuer | 16/114 R |
| 5,005,255 | 4/1991 | Pare et al. | 16/115 |
| 5,127,131 | 7/1992 | Corrigan et al. | 16/114 R |
| 5,265,307 | 11/1993 | Hull et al. | 16/125 |
| 5,289,614 | 3/1994 | Hartz | 16/114 R |

*Primary Examiner*—P. Austin Bradley
*Assistant Examiner*—Chuck Y. Mah
*Attorney, Agent, or Firm*—Thomas A. Rendos

[57] ABSTRACT

A spacecraft-component handle assembly for use as a single replacement of most handles on most components of a spacecraft is provided. This handle assembly includes a baseplate having a slot with an axis and with diametrically opposite inner bearing surfaces and includes a handle unit having a coaxial flanged bar with diametrically opposite outer bearing surfaces for engaging the respective inner bearing surfaces. The assembly also includes a lock unit with a lock release mechanism.

7 Claims, 2 Drawing Sheets

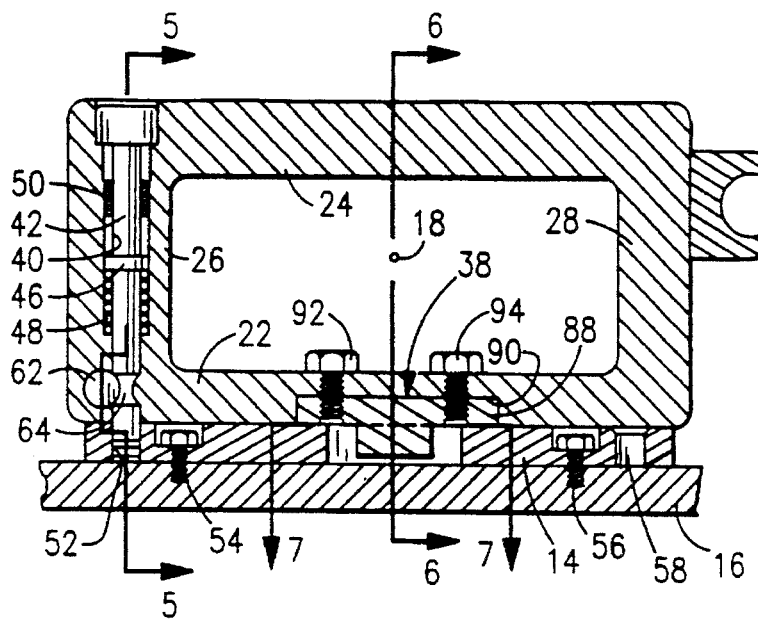
FIG.4
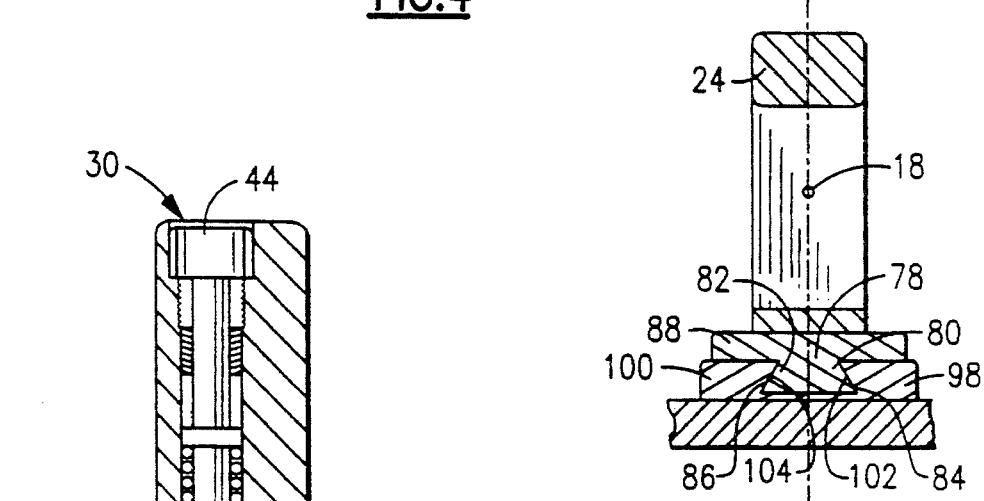
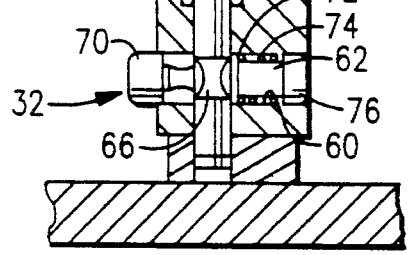
FIG.5
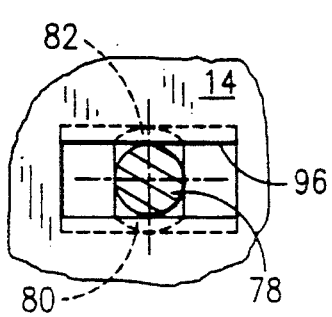
FIG.7

SPACECRAFT HANDLE

FIELD OF THE INVENTION

The invention generally relates to a spacecraft handle, and in particular the invention relates to a spacecraft-component removable handle assembly, which has a one-hand operated, lock-type handle unit that is removable and which has a baseplate unit that is attached to the spacecraft component.

BACKGROUND OF THE INVENTION

Current and future spacecraft are being designed so that failed components may be replaced on orbit by a robot or an astronaut performing extra vehicular activities (EVA). These replaceable components are called orbital replaceable units (ORU's). In order for the astronaut or robot to perform this replacement, the ORU must have a handle attached to it. Since orbiting spacecraft weight should be minimized, a standardized removable handle offers the advantage in that one handle may be used on many ORU's, thereby minimizing spacecraft weight.

SUMMARY OF THE INVENTION

According to the present invention, a spacecraft-component handle assembly is provided. This handle assembly includes a baseplate for mounting on the component and having a slot with diametrically-opposite sidewall inner bearing surfaces, and includes a removable handle unit having a coaxial bar with diametrically-opposite flange outer bearing surfaces which respectively engage the sidewall inner bearing surfaces, and includes a lock device with a release mechanism.

By using the removable handle unit, a single handle unit can be used in place of a plurality of individual handles whereby spacecraft weight is minimized.

One object of the present invention is to use a single standard removable handle unit in place of a plurality of handles on components of a spacecraft.

Another object is to minimize the weights of components of a spacecraft.

A further object is to provide a handle assembly which has a fail-safe connection device with an independent lock unit.

BRIEF DESCRIPTION OF THE DRAWINGS

The foregoing and other objects, features and advantages will be apparent from the following description of the preferred embodiment of the invention as illustrated in the accompanying drawings.

FIG. 4 is a section view as taken along the line 4—4 of FIG. 2.

FIG. 5 is a section view as taken along the line 5—5 of FIG. 4.

FIG. 6 is a section view as taken along the line 6—6 of FIG. 4; and

FIG. 7 is a section view as taken along the line 7—7 of FIG. 4.

DESCRIPTION OF THE PREFERRED EMBODIMENT

Figure 1:
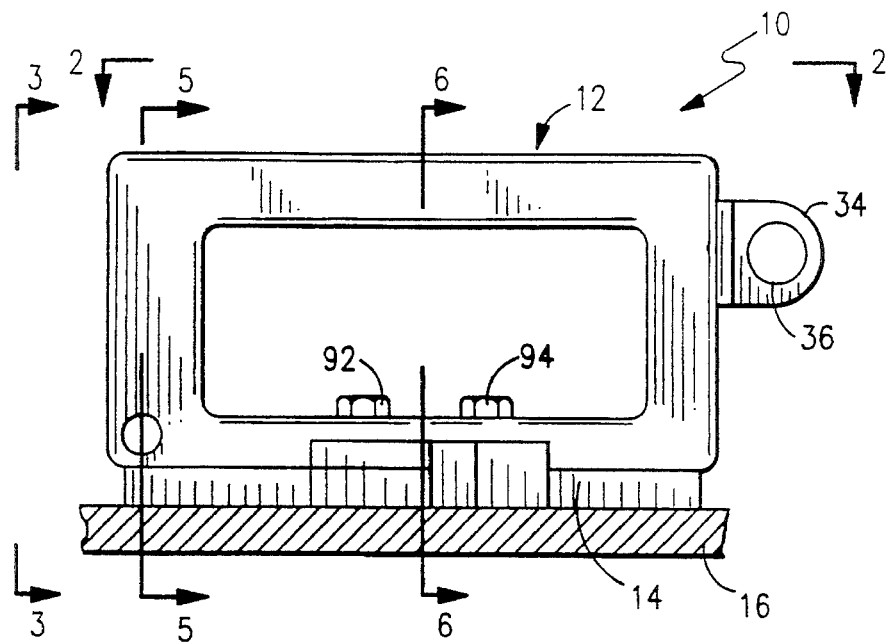
FIG. 1 is an elevation view of a handle assembly according to the present invention.
Figure 2:
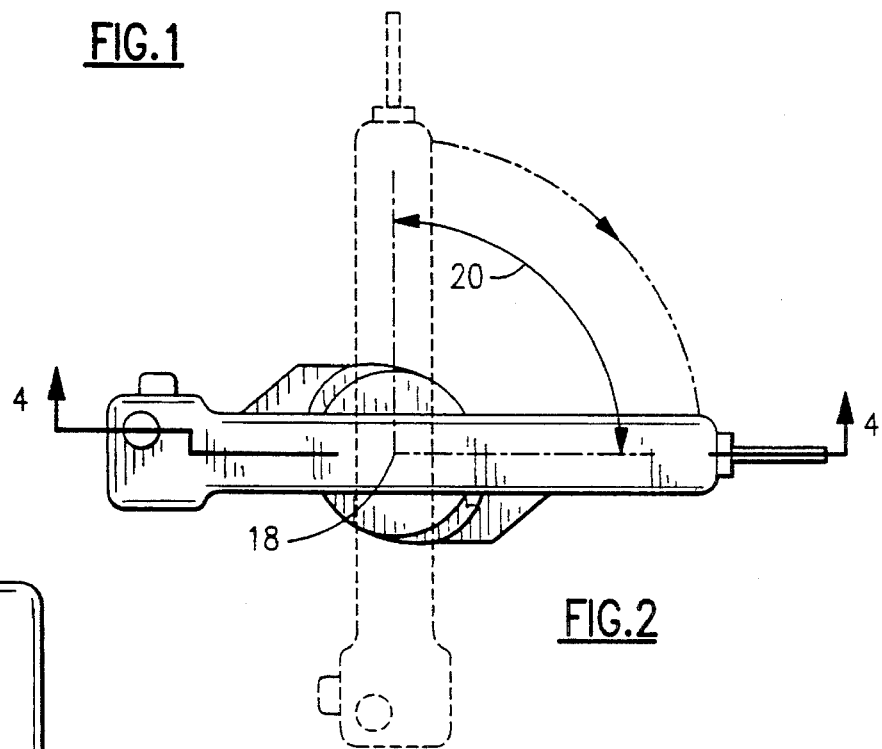
FIG. 2 is a top view as taken along the line 2—2 of FIG. 1.
Figure 3:
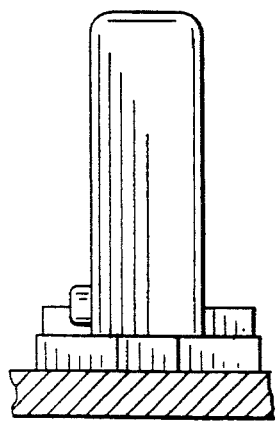
FIG. 3 is a front view as taken along the line 3—3 of FIG. 1.

As shown in FIGS. 1 through 7, a spacecraft-component handle assembly or a handling device or handling assembly 10 is provided. Assembly 10 includes a grip unit or handle unit or handle 12 and includes a baseplate unit 14. Baseplate unit 14 is attached to a spacecraft component wall or plate 16. Handle unit 12 is angularly displaceable about an axis 18 relative to baseplate unit 14 through an angle 20 of about 90 degrees, from an unlock position to a lock position. Handle unit 12 is separable or removable from baseplate unit 14 in the unlock position.

Handle unit 12 which has a frame-type construction includes a bottom bar 22, a top bar 24, a leftside bar 26, and a rightside bar 28. Bars 22, 24, 26, 28 have fixed ends. Leftside bar 26 has a lock unit 3Q and a lock release unit 32. Rightside bar 28 has a tee-shaped integral tether attachment 34 with a tether hole 36. Bottom bar 22 has a flanged cylinder or connection unit 38 which engages baseplate 14.

Lock unit 30 includes a vertical, elongate pin hole 40 in leftside bar 26 which receives an elongate slide pin 42. Pin 42 has a top lock button 44 at the top end thereof for locking of pin 42 by the thumb of a user while the user grips top bar 24 by hand. Pin 42 has an upset or flange portion 46, which bears against a compression spring 48. In FIG. 4 and 5, pin 42 is shown in its lock position with button 44 pressed down and compression spring 48 compressed. Pin 42 has a stop fitting 50 for stopping the upward travel of pin 42 at its unlock position after its release by lock release unit 32.

Baseplate 14 has a front hole 52 which receives pin 42 at the end thereof in the latch position of pin 42. Baseplate 14 has two front screws 54 and two rear screws 56 which connect to component plate 16 and which fixedly connect baseplate 14 to component plate 16. Baseplate 14 has a rear latch hole 58 for pin 42 for use when handle unit 12 is in a reversed orientation or 180 degree orientation from that shown in FIG. 1.

Release unit 32 includes an intersecting bolt hole 60 in leftside bar 26 which receives a slide bolt 62. In the pin lock position, bolt 62 is received in an annular groove 64 in pin 42. In the pin unlock position, bolt 62 releases pin 42. Bolt 62 has an annular recess 66 which receives pin 42 in the lock position of pin 42. In FIG. 5, bolt 62 is shown in its unlatch position. Bolt 62 has a button head 70 which can be operated by the index finger of a user for unlocking pin 42, while the user grips the top bar 24 by hand. Thus, assembly 10 is operated by the user by one hand. Bolt 62 has an upset flange portion 72 which bears against a compression spring 74, spring 74 bears against a round plug 76, so that bolt 62 is always urged toward the bolt release position. Pin 42 is released from bolt 62 when bolt button 70 is pushed down.

Connection unit 38 has a cone or conical bar portion 78 which has first and second flanges 80, 82 with respective first and second top bearing surfaces 84, 86. Cylinder 78 has a top integral plate 88, which is received in a recess 90 in bottom bar 22, and held in place by two machine bolts 92, 94. Baseplate 14 has a slotted hole 96 with front and back inclined sidewalls 98, 100 with bearing surfaces 102, 104, which bear against flange bearing surfaces 84, 86 respectively in the handle lock position as shown in FIGS. 4, 5 and 7.

A light-weight ¼ turn installation, removable handle assembly 10 which has a simple unique attachment method is provided. The grip on the handle 12 is the NASA standard handrail grip. The handle 12 has two buttons, a lock button 44 on top of the handle and a release button 70 located near the base of the handle 12. The lock button 44 is within a thumbs reach while gripping the handle 12. The release button 70 is located away from the gripping area 24 of the handle 12 to minimize the chance of accidentally pressing the release button 70 during handling of the ORU 16. Only one button will be in the out position at any one time, indicating locked or unlocked status. Buttons may also be color coded. At the back of the handle, a standard tether attachment eyelet 34 is provided.

The handle 12 fits into the low profile lightweight baseplate 14 permanently attached to the ORU 16 by screws 54, 56. The baseplate 14 has two alignment features to guide the handle into the correct position during installation. The alignment features also give positive visual indication that the handle is correctly installed into the baseplate 14.

The handle 12 is installed into the baseplate 14 at an angle of 90 degrees from its final locked position, then rotated 90 degrees clockwise to lock the protruding cone 78 on the handle 12 into the interfacing hole 96 in the baseplate 14. The user then pushes the lock button 44 which inserts pin 42 into the baseplate 14 and prevents the handle 12 from rotating and allows the release button 70 to slide into a position preventing the lockpin 66 from being released without pressing the release button 70. However, even if the release button 70 is depressed, the handle 12 can only be removed by first rotating 90 degrees counter clockwise. This dual action prevents inadvertent release of the handle 12 from the ORU 16. Unlike existing devices, this handle 12 can be installed and removed using only one hand; both installation and removal is quick, unambiguous and reliable, therefore reducing EVA time. The ¼ turn handle 12 can be used on any ORU 16 where the baseplate 14 can be mounted. The handle 12 can be installed into the baseplate 14 in either of two positions, one rotated 180 degrees from the other.

The advantages of assembly 10 are indicated hereafter.

A) The ¼ turn handle assembly 10 has a very simple lock/release mechanism consisting of only two moving parts 42, 62 and two springs 48, 74. This simple mechanism equated to a very reliable handle and is much simpler than prior art handles.

B) The prototype of the ¼ turn handle 12 weighs approximately 1.7 pounds and the baseplate 0.5 pounds. This is 13.3 pounds lighter than the closest prior art handle. The ¼ turn handle 12 can also carry the required loads as generated by an astronaut.

C) Assembly 10 can carry and support loads and moments about three axes, including its axis 18 about its other two coordinate axes, which are in a plane normal to axis 18.

D) Lock mechanism 30 is a simple and reliable mechanism.

E) The installation of handle unit 12 using a one-quarter turn of handle unit 12 is of minimal difficulty for an astronaut or user.

F) The installation of handle unit 12 into baseplate 14 by a robot-like apparatus is facilitated.

G) By eliminating all handles on most components of a spacecraft, and by substituting for them a single removable handle unit 12, the weight of each such spacecraft component is minimized.

While the invention has been described in its preferred embodiment, it is to be understood that the words which have been used are words of description rather than limitation and that changes may be made within the purview of the appended claims without departing from the true scope and spirit of the invention in its broader aspects.

For example, the bearing surfaces 84, 86 can have a helical shape, instead of a flat, inclined shape.

What is claimed is:

1. A spacecraft handle assembly comprising:

a baseplate for mounting on a component of a spacecraft;

said baseplate having a wall with first and second inner bearing surfaces and having a slot extending through the baseplate and bearing surfaces;

a handle unit having an axis for angular displacement about said axis through a selective angle from an unlock position to a lock position thereof;

said handle unit having a coaxial connection means connecting to the baseplate;

said connection means having a coaxial bar portion with first and second flange portions for insertion through the baseplate slot; and said first and second flange portions having first and second outer bearing surfaces for bearing against the respective baseplate first and second inner bearing surfaces.

2. The assembly of claim 1 including:

a lock unit supported by the handle unit and having a slide pin for receival in a lock hole in the baseplate in a lock position of the slide pin;

said slide pin having a compression spring for urging the slide pin away from its lock position and having a pin lock groove;

a release unit supported by the handle unit and having a slide bolt for receival in the pin lock groove and having a bolt release groove; and said slide bolt having a compression spring for urging the side bolt into the pin lock groove and having a button head for sliding the bolt to position the bolt release groove opposite to the pin.

3. The assembly of claim 2, wherein said handle unit is a four-sided frame having a bottom bar and a top bar and a leftside bar and a rightside bar;

said top bar having a one-hand grip for actuating a slide pin button by the thumb; and said leftside bar having an elongate pin hole receiving the slide pin and having an intersecting bolt hole receiving the slide bolt.

4. The assembly of claim 1, wherein said first and second inner bearing surfaces and said first and second outer bearing surfaces each is disposed in a plane, each said plane being inclined to said axis.

5. The assembly of claim 2, wherein said baseplate has a rear lock hole which is angularly spaced about the axis approximately 180 from said front lock hole for receival of the slide pin when the handle unit is reoriented and faced rearwardly.

6. A method of handling a spacecraft component including the steps of:

mounting a baseplate having a slot with opposite sidewall inner bearing surfaces on the component;

forming a handle unit having an axis and having a coaxial bar portion with opposite flange outer bearing surfaces;

inserting the bar portion into the slot in an unlock position;

angularly displacing the handle unit about the axis through a select angle for engagement of the respective opposite pairs of bearing surfaces;

locking the handle unit to the baseplate; and releasing the locked handle unit after a desired time interval.

7. A handle assembly comprising:

a baseplate having a slot with sidewall inner bearing surfaces;

a handle unit having a bar with an axis and with diametrically opposite flange outer bearing surfaces engaging the inner bearing surfaces;

lock means for locking the handle unit to the baseplate; and release means for unlocking the lock means.

* * * * *

UNITED STATES PATENT AND TRADEMARK OFFICE
CERTIFICATE OF CORRECTION

PATENT NO. : 5,485,654
DATED : January 23, 1996
INVENTOR(S) : Robert P. Nespodzany, Jr.

It is certified that error appears in the above-indentified patent and that said Letters Patent is hereby corrected as shown below:

Column 4, line 36, cancel "head" and replace with --heal--

Column 4, line 56, after "180" insert --degrees--

Signed and Sealed this

Twenty-first Day of May, 1996

Attest:

BRUCE LEHMAN

*Attesting Officer*     *Commissioner of Patents and Trademarks*